United States Patent [19]

Sugiyama

[11] Patent Number: 5,249,040
[45] Date of Patent: Sep. 28, 1993

[54] ADAPTIVE DEVICE FOR SEPARATING A LUMINANCE SIGNAL AND A COLOR SIGNAL

[75] Inventor: Kenji Sugiyama, Noda, Japan

[73] Assignee: Victor Company of Japan, Ltd., Japan

[21] Appl. No.: 534,643

[22] Filed: Jun. 7, 1990

[30] Foreign Application Priority Data

Jun. 13, 1989 [JP] Japan .................. 1-150210

[51] Int. Cl.$^5$ .............................................. H04N 9/64
[52] U.S. Cl. .............................................. 358/31
[58] Field of Search .............................................. 358/31

[56] References Cited

U.S. PATENT DOCUMENTS

| | | | |
|---|---|---|---|
| 4,754,322 | 6/1988 | Okuda et al. | 358/31 |
| 4,907,073 | 3/1990 | Sugiyama . | |
| 4,979,023 | 12/1990 | Tsinberg et al. | 358/31 |
| 4,982,271 | 1/1991 | Sugiyama et al. | 358/31 |

FOREIGN PATENT DOCUMENTS

| | | |
|---|---|---|
| 60-165889 | 8/1985 | Japan . |
| 8221794 | 9/1988 | Japan . |
| 1-162493 | 6/1989 | Japan . |
| 1-176188 | 7/1989 | Japan . |
| 1-176190 | 12/1989 | Japan . |

Primary Examiner—Howard W. Britton
Assistant Examiner—Wendy R. Greening
Attorney, Agent, or Firm—Lowe, Price, LeBlanc & Becker

[57] ABSTRACT

An adaptive device for separating a luminance signal and a color signal includes a spatiotemporal filter extracting a color signal from a composite television signal, the filter having a vertical direction pass band, a horizontal direction pass band and a time direction pass band. A variation in the composite television signal in a vertical direction is detected. A vertical variation signal represents the detected variation in the composite television signal in the vertical direction. A variation in the composite television signal in a horizontal direction is detected. A horizontal variation signal represents the detected variation in the composite television signal in the horizontal direction. The vertical and horizontal variation signals control the mixing rate between the composite television signal and an output from a time direction filter. In cases where the vertical variation signal and the horizontal variation signal have appreciable values respectively, the time direction pass band of the spatiotemporal filter is varied in accordance with the values of the vertical variation signal and the horizontal variation signal.

5 Claims, 1 Drawing Sheet

ADAPTIVE DEVICE FOR SEPARATING A LUMINANCE SIGNAL AND A COLOR SIGNAL

BACKGROUND OF THE INVENTION

This invention relates to an adaptive device for separating a luminance signal and a color signal in color video systems or color television receivers. Such a device is generally called a Y-signal/C-signal separation filter.

In recent color television receives, a fixed-type two-dimensional filter using a comb filter is generally used to separately derive a luminance signal (a Y signal) and a color signal (a carrier chrominance signal, a C signal) from a composite color television signal.

Japanese published unexamined patent application 60-165889 discloses an adaptive comb filter for separating a luminance signal and a color signal. In the adaptive comb filter of Japanese application 60-165889, characteristics of a two-dimensional filter element are changed in accordance with conditions of adjacent picture elements.

The adaptive comb filter of Japanese application 60-165889 includes two different filter elements, that is, a vertical direction separation filter and a horizontal direction separation filter, each separately deriving a luminance signal and a color signal from a digitized composite color television signal. In the case where a given area surrounding a picture element has a smaller data variation in a vertical direction than a data variation in a horizontal direction, a luminance signal and a color signal outputted from the vertical direction separation filter are selected. In the opposite case, a luminance signal and a color signal outputted from the horizontal direction separation filter are selected. This selective change of the filter characteristics enables accurate separation of the luminance signal and the color signal in abruptly-varying portions of a picture, so that dot interference and cross color can be decreased.

In the adaptive comb filter of Japanese application 60-165889, since the filter characteristics are changeable between only two states and these states are extremely different, a luminance signal and a color signal tend to be considerably discontinuous in waveform and be thus contaminated by noises at moments corresponding to changes of the filter characteristics. In regions where the degrees of variations in the vertical and horizontal directions are similar so that the filter characteristics are frequently changed, such noises are conspicuous.

In the adaptive comb filter of Japanese application 60-165889, when the vertical direction separation filter is selected, the band of the luminance signal in the vertical direction is limited regardless of that in the horizontal direction. When the horizontal direction separation filter is selected, the band of the luminance signal in the horizontal direction is limited regardless of that in the vertical direction. Accordingly, the band of the luminance signal is sometimes decreased to a region without the color signal so that the resolution tends to be lowered.

In regions which have considerable variations in both of the vertical and horizontal directions, the adaptive comb filter of Japanese application 60-165889 causes the band of the color signal in one of the two directions to be widened so that cross color tends to be generated at an unacceptable level.

U.S. Pat. No. 4,907,073 (Japanese patent application 62-320965) discloses an adaptive device for separating a luminance signal and a color signal which is designed to resolve the previously-mentioned problems in the adaptive comb filter of Japanese application 60-165889. In the adaptive device of U.S. Pat. No. 4,907,073, a combination of a variable vertical-direction band pass filter and a variable horizontal-direction band pass filter extracts a color signal from a composite television signal. In addition, a vertical-direction variation detector detects a difference between levels of the composite television signal at sampling points separated vertically in a picture. A horizontal-direction variation detector detects a difference between levels of the composite television signal at sampling points separated horizontally in a picture. Pass bands of the vertical-direction band pass filter and the horizontal-direction band pass filter are controlled in accordance with output signals from the vertical-direction variation detector and the horizontal-direction variation detector. A luminance signal is derived from the composite television signal and the extracted color signal.

The adaptive device of U.S. Pat. No. 4,907,073 tends to cause crosstalk such as dot interference and cross color in the case of a television signal having a large amount of components corresponding to inclined spatial edges.

U.S. patent application Ser. No. 289,804 filed on Dec. 27, 1988 (Japanese patent application 62-336121) now U.S. Pat. No. 4,982,271 relates to a motion-adaptive device for separating a luminance signal and a color signal which is designed to resolve the previously-mentioned problems in the adaptive comb filter of Japanese application 60-165889 and the adaptive device of U.S. Pat. No. 4,907,073. The motion-adaptive device of U.S. patent application Ser. No. 289,804 includes a variable vertical-direction filter, a variable horizontal-direction filter, and a time-direction filter composing a three-dimensional spatiotemporal filter. The motion-adaptive device of U.S. patent application Ser. No. 289,804 also includes a motion detector. The characteristics of the three-dimensional spatiotemporal filter are controlled in accordance with the spatial shape and the motion of a picture.

The motion-adaptive device of U.S. patent application Ser. No. 289,804 tends to cause crosstalk in the case of a moving picture. In addition, the motion detector of the motion-adaptive device of U.S. patent application Ser. No. 289,804 requires a large-capacity memory.

SUMMARY OF THE INVENTION

It is an object of this invention to provide an excellent adaptive device for separating a luminance signal and a color signal.

According to a first aspect of this invention, an adaptive device for separating a luminance signal and a color signal comprises a spatiotemporal filter having a vertical direction pass band, a horizontal direction pass band, and a time direction pass band, and extracting a color signal from a composite television signal; means for detecting a variation in the composite television signal in a vertical direction and outputting a vertical variation signal representative of the detected variation in the composite television signal in the vertical direction; means for detecting a variation in the composite television signal in a horizontal direction and outputting a horizontal variation signal representative of the detected variation in the composite television signal in the horizontal direction; and means for, in cases where the vertical variation signal and the horizontal variation signal have appreciable values respectively, varying the time direction pass band of the spatiotemporal filter in accordance with the values of the vertical variation signal and the horizontal variation signal.

According to a second aspect of this invention, an adaptive device comprises a time direction filter processing a composite television signal; means for mixing an output signal from the time direction filter and the composite television signal at a variable mixing rate; means for detecting an amount of components of the composite television signal which correspond to inclined spatial edges in a picture represented by the composite television signal; and means for varying the mixing rate in accordance with the amount of the components which is detected by the detecting means.

According to a third aspect of this invention, an adaptive device comprises a spatiotemporal filter extracting a color signal from a composite television signal and having a variable time direction filtering characteristic; means for detecting an amount of components of the composite television signal which correspond to inclined spatial edges in a picture represented by the composite television signal; and means for varying the time direction filtering characteristic of the spatiotemporal filter in accordance with the amount of the components which is detected by the detecting means.

DESCRIPTION OF THE PREFERRED EMBODIMENT

Figure 1:
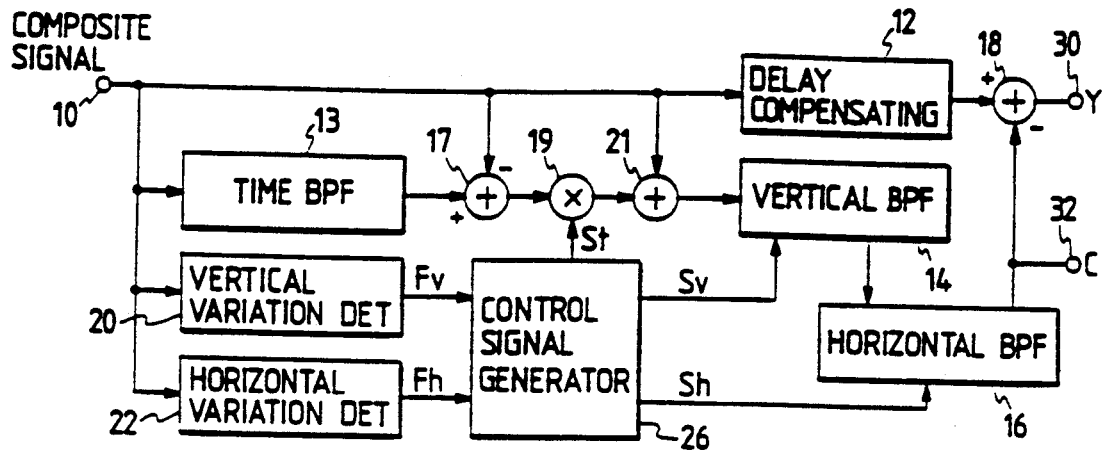
FIG. 1 is a block diagram of an adaptive device for separating a luminance signal and a color signal according to an embodiment of this invention.

With reference to FIG. 1, an input terminal 10 is subjected to a digital composite color television signal which is derived from an analog composite color television signal by an analog-to-digital converter (not shown). The digitization of the analog signal contains a sampling process. The digital composite color television signal is fed via the input terminal 10 to a delay compensating circuit 12, a time direction digital band pass filter (BPF) 13, a minus input terminal of a subtracter 17, a first input terminal of an adder 21, a vertical direction variation detector 20, and a horizontal direction variation detector 22. The time direction BPF 13 functions to pass a composite television signal according to its band-pass characteristic in the time domain.

The delay compensating circuit 12 delays the input composite television signal by a predetermined time. An output signal from the delay compensating circuit 12 is applied to a plus input terminal of a subtracter 18. As will be described later, a minus input terminal of the subtracter 18 is subjected to a color signal (a C signal). The delay compensating circuit removes a phase difference or a delay time difference between the color signal applied to the subtracter 18 and the color signal components in the composite television signal applied to the subtracter 18 so that the subtracter 18 can extract accurate luminance signal (Y signal) components.

The time direction BPF 13 selects and passes a time band of the input composite television signal in which color signal components are present. The time direction BPF 13 may be of the type shown in U.S. patent application Ser. No. 289,804 filed on Dec. 27, 1988, the disclosure of which is hereby incorporated by reference.

An output signal from the time direction BPF 13 is fed to a plus input terminal of the subtracter 17. As described previously, the minus input terminal of the subtracter 17 is subjected to the composite television signal. The subtracter 17 generates a signal which is equal to data of the output signal from the time direction BPF 13 minus data of the composite television signal. An output signal from the subtracter 17 is fed to a first input terminal of a multiplier 19. A second input terminal of the multiplier 19 receives a time control signal St from a control signal generator 26 which will be explained later. The multiplier 19 multiplies data of the output signal from the subtracter 17 by data of the control signal St. An output signal from the multiplier 19 is applied to a second input terminal of the adder 21. As described previously, the first input terminal of the adder 21 is subjected to the composite video signal. The adder 21 adds data of the output signal from the multiplier 19 and data of the composite video signal. The combination of the subtracter 17, the multiplier 19, and the adder 21 serves to mix the output signal from the time direction BPF 13 and the composite television signal at a rate determined by the control signal St.

An output signal from the adder 21 is fed to a vertical direction digital band pass filter (BPF) 14 of a variable type. The vertical direction BPF 14 has a variable pass band with respect to a color signal. The pass band of the vertical direction BPF 14 is defined in a vertical direction of the spatial frequency domain. A width of the vertical pass band can be varied by a vertical control signal Sv fed from the control signal generator 26. The vertical direction BPF 14 is connected in cascade with a horizontal direction digital band pass filter (BPF) 16 of a variable type. The horizontal direction BPF 16 has a variable pass band with respect to a color signal. The pass band of the horizontal direction BPF 16 is defined in a horizontal direction of the spatial frequency domain. A width of the horizontal pass band can be varied by a horizontal control signal Sh fed from the control signal generator 26. The output signal from the adder 21 is processed successively by the vertical direction BPF 14 and the horizontal direction BPF 16 into a color signal (a carrier chrominance signal) C. The color signal C is applied to a minus input terminal of the subtracter 18 and an output terminal 32. The vertical direction BPF 14 and the horizontal direction BPF 16 may be of the types shown in U.S. Pat. No. 4,907,073, the disclosure of which is hereby incorporated by reference.

The time direction BPF 13, the vertical direction BPF 14, and the horizontal direction BPF 16 constitute three basic elements of a spatiotemporal filter which extracts the color signal C from the composite television signal. As will be made clear later, the time direction pass band, the vertical direction pass band, and the horizontal direction pass band of the spatiotemporal filter are controlled in accordance with conditions of a picture.

The subtracter 18 generates a luminance signal Y in accordance with the output signal from the delay compensating circuit 12 and the color signal C. Specifically, the luminance signal Y corresponds to data which are equal to data of the output signal from the delay compensating circuit 12 minus data of the color signal C. The luminance signal Y is applied to an output terminal 30.

Values represented by data of the control signals Sv, St, and Sh are variable in the range of "0" to "1". These values are adjusted by the control signal generator 26. As the value of the control signal Sv decreases from "1" to "0", the width of the pass band of the vertical direction BPF 14 increases from a minimum value to a maximum value. Similarly, as the value of the control signal Sh decreases from "1" to "0", the width of the pass band of the horizontal direction BPF 16 increases from a minimum value to a maximum value. As described previously, the composite television signal and the output signal from the time direction BPF 13 are mixed by the circuit including the subtracter 17, the multiplier 19, and the adder 21. In the case where the value of the control signal St is "0", the output signal from the time direction BPF 13 is cancelled by the multiplier 19 so that the adder 21 outputs the composite television signal as it is. In the case where the value of the control signal St is "1", the composite television signal is cancelled by the combination of the subtractor 17 and the adder 21 so that the adder 21 outputs the output signal of the time direction BPF 13 as it is. In the case where the value of the control signal St is intermediate between "0" and "1", the composite television signal and the output signal from the time direction BPF 13 are mixed at a rate dependent on the control signal value so that the adder 21 outputs a resultant mixture of these two signals. The control signal generator 26 adjusts the value of the control signal St in the range of "0" to "1" to control the rate of the mixing between the composite television signal and the output signal from the time direction BPF 13. As will be made clear later, the value of the control signal St is determined in accordance with picture conditions so that the control of the extraction of the color signal depends on the picture conditions.

The vertical direction variation detector 20 calculates the difference between data at vertically separated sampling points in a picture and generates a vertical variation signal Fv representative of the calculated difference. The vertical variation signal Fv is fed to the control signal generator 26. The horizontal direction variation detector 22 calculates the difference between data at horizontally separated sampling points in a picture and generates a horizontal variation signal Fh representative of the calculated difference. The horizontal variation signal Fh is fed to the control signal generator 26. The vertical direction variation detector 20 and the horizontal direction variation detector 22 may be the types shown in U.S. Pat. No. 4,907,073, the disclosure of which is hereby incorporated by reference.

Figure 2:
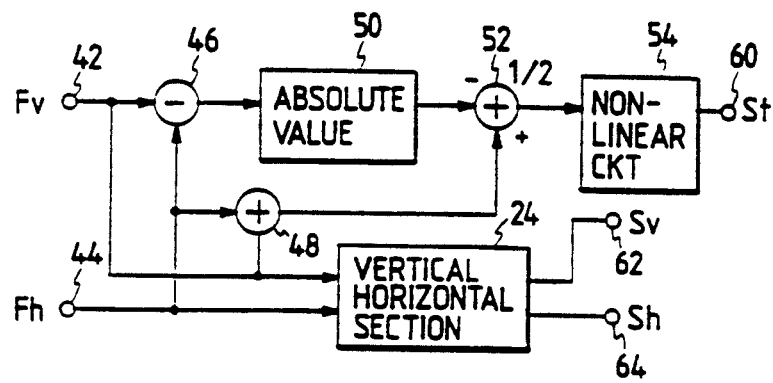
FIG. 2 is a block diagram of the control signal generator of FIG. 1.

The control signal generator 26 generates the control signals Sv, Sh, and St on the basis of the vertical variation signal Fv and the horizontal variation signal Fh. As shown in FIG. 2, the control signal generator 26 has a vertical and horizontal section 24 and a time section (no reference character).

The vertical and horizontal section 24 receives the vertical variation signal Fv and the horizontal variation signal Fh via terminals 42 and 44 respectively, and generates the vertical control signal Sv and the horizontal control signal Sh in accordance with the vertical variation signal Fv and the horizontal variation signal Fh. The vertical and horizontal section 24 includes a read-only memory (ROM) storing a table of data which corresponds to predetermined functions for generating the vertical control signal Sv and the horizontal control signal Sh in response to the vertical variation signal Fv and the horizontal variation signal Fh. Specifically, the vertical variation signal Fv and the horizontal variation signal Fh are used as an address signal for the access to the ROM so that data are read out from the storage location of the ROM which is designated by the address signal. The data read out from the ROM constitute the vertical control signal Sv and the horizontal control signal Sh. The vertical and horizontal section 24 may be of the type shown as "the control signal generator 24" in U.S. Pat. No. 4,907,073, the disclosure of which is hereby incorporated by reference.

The time section of the control signal generator 26 generates the time control signal St in accordance with the vertical variation signal Fv and the horizontal variation signal Fh. The time section includes a subtracter 46 and a adder 48 each receiving the vertical variation signal Fv and the horizontal variation signal Fh via the terminals 42 and 44. The subtracter 46 calculates the subtraction value "Fv−Fh" which is equal to the data of the vertical variation signal Fv minus the data of the horizontal variation signal Fh. The adder 48 calculates the addition value "Fv+Fh" which is equal to the data of the vertical variation signal Fv plus the data of the horizontal variation signal Fh. The subtraction value "Fv−Fh" is fed to an absolute value circuit 50. The absolute value "|Fv−Fh|" of the subtraction value "Fv−Fh" is calculated by the absolute value circuit 50. The absolute value "|Fv−Fh|" is fed to a minus input terminal of a subtracter 52. The addition value "Fv+Fh" is fed to a plus input terminal of the subtracter 52. The subtracter 52 calculates the value "Fv+Fh−|Fv−Fh|" which is equal to the addition value "Fv+Fh" minus the absolute value "|Fv−Fh|". The subtracter 52 is of such a type that the value "Fv+Fh−|Fv−Fh|" divided by 2 will be outputted from the subtracter 52. Accordingly, the subtracter 52 outputs the value "(Fv+Fh−|Fv−Fh|)/2". The value outputted from the subtracter 52 increases as the addition value "Fv+Fh" increases. In addition, the value outputted from the subtracter 52 increases as the absolute value "|Fv−Fh|" decreases. The value outputted from the subtracter 52 depends on an amount of components in the composite television signal which correspond to inclined spatial edges. The value "(Fv+Fh−|Fv−Fh|)/2" is inputted into a nonlinear circuit or a function generator 54. The nonlinear circuit 54 converts the input value "(Fv+Fh−|Fv−Fh|)/2" into a value of the time control signal St. In this way, the nonlinear circuit 54 generates the time control signal St in accordance with the input signal representing the value "(Fv+Fh−|Fv−Fh|)/2" related to an amount of components in the composite television signal which correspond to inclined spatial edges.

Figure 3:
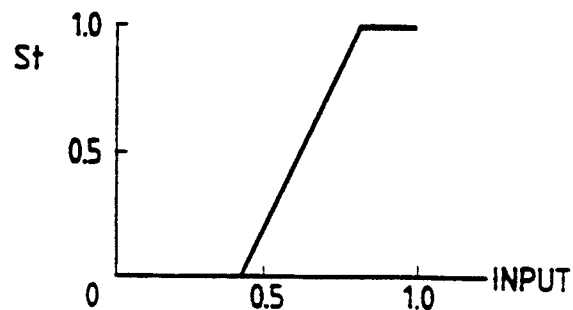
FIG. 3 is a diagram showing an input-output characteristic of the nonlinear circuit of FIG. 2.

FIG. 3 shows an input-output characteristic of the nonlinear circuit 54. The input-output characteristic curve is divided into three parts corresponding to a dead region, an active region, and a saturation region. When the input value is in the dead range extending between "0" and a lower reference value, the output value remains "0". For example, the lower reference value is set between "0.3" and "0.5". In the case where the input value is in the active range extending between the lower reference value and a higher reference value, the output value linearly increases from "0" to "1" as the input value increases. For example, the higher reference value is set between "0.7" and "0.9". When the input value is in the saturation region extending between the higher reference value and "1", the output value remains "1".

The relation among the vertical variation signal Fv, the horizontal variation signal Fh, and the time control signal St enables the following operations. In the case where the vertical variation signal Fv and the horizontal variation signal Fh have values which are greater than given appreciable values and which are comparable to each other, that is, in the case where the inclined edge exists in the picture, the value of the time control signal St is large so that the output signal from the time direction BPF 13 is dominant in the output signal from the adder 21. Accordingly, in this case, the width of the time direction pass band of the spatiotemporal filter is narrow, and crosstalk is effectively prevented. Furthermore, in this case, as the values of the vertical variation signal Fv and the horizontal variation signal Fh increase, that is, as the amount of signal components corresponding to inclined spatial edges increases, the value of the time control signal St is larger so that the output signal from the time direction BPF 13 is more dominant in the output signal from the adder 21.

In the case where only one of the values of the vertical variation signal Fv and the horizontal variation signal Fh is large, that is, in the case where the composite television signal has a large amount of components corresponding to vertical or horizontal edges but has at most a negligible amount of components corresponding to inclined spatial edges, the value of the time control signal St is small so that the output signal from the time direction BPF 13 occupies at most a small part of the output signal from the adder 21. Accordingly, in this case, the time direction BPF is substantially ineffective. In addition, the signal components corresponding to vertical or horizontal edges are effectively processed by the vertical direction BPF 14 or the horizontal direction BPF 16 as in U.S. Pat. No. 4,907,073.

What is claimed is:

1. An adaptive device for separating a luminance signal and a color signal, comprising:
    a spatiotemporal filter extracting a color signal from a composite television signal, said spatiotemporal filter having a vertical direction pass band, a horizontal direction pass band, and a time direction pass band;
    means for detecting a variation in the composite television signal in a vertical direction and outputting a vertical variation signal representative of the detected variation in the composite television signal in the vertical direction;
    means for detecting a variation in the composite television signal in a horizontal direction and outputting a horizontal variation signal representative of the detected variation in the composite television signal in the horizontal direction; and
    means for, in cases where the vertical variation signal and the horizontal variation signal have appreciable values respectively, varying the time direction pass band of the spatiotemporal filter in accordance with the values of the vertical variation signal and the horizontal variation signal.

2. The adaptive device of claim 1 wherein the varying means comprises means for narrowing the time direction pass band as the values of the vertical variation signal and the horizontal variation signal increase.

3. An adaptive device comprising:
    a time direction filter processing a composite television signal;
    means for mixing an output signal from the time direction filter and the composite television signal at a variable mixing rate;
    means for detecting an amount of components of the composite television signal which correspond to inclined spatial edges in a picture represented by the composite television signal; and
    means for varying the mixing rate in accordance with the amount of the components which is detected by the detecting means.

4. The adaptive device of claim 3 further comprising:
    a spatial filter processing an output signal from the mixing means into a color signal and having a variable filtering characteristic;
    vertical variation detecting means for detecting a variation in the composite television signal in a vertical direction;
    horizontal variation detecting means for detecting a variation in the composite television signal in a horizontal direction; and
    means for varying the filtering characteristic of the spatial filter in accordance with the variations detected by the vertical variation detecting means and the horizontal variation detecting means.

5. An adaptive device comprising:
    a spatiotemporal filter extracting a color signal from a composite television signal and having a variable time direction filtering characteristic;
    means for detecting an amount of components of the composite television signal which correspond to inclined spatial edges in a picture represented by the composite television signal; and
    means for varying the time direction filtering characteristic of the spatiotemporal filter in accordance with the amount of the components which is detected by the detecting means.

* * * * *